United States Patent [19]
Arakawa

[11] Patent Number: 5,247,905
[45] Date of Patent: Sep. 28, 1993

[54] ANIMAL HARNESS

[75] Inventor: Makoto Arakawa, Tokyo, Japan

[73] Assignees: Kabushikigaisha Heisei, Tokyo; Hayashi Kabushikigaisha, Osaka, both of Japan

[21] Appl. No.: 964,855

[22] Filed: Oct. 22, 1992

[30] Foreign Application Priority Data

| Oct. 30, 1991 [JP] | Japan | 3-311984 |
| Feb. 7, 1992 [JP] | Japan | 4-12867[U] |
| May 1, 1992 [JP] | Japan | 4-36084[U] |

[51] Int. Cl.$^5$ ............................ A01K 27/00
[52] U.S. Cl. ........................... 119/863; 119/907
[58] Field of Search ............. 119/96, 101, 106; 182/3

[56] References Cited

U.S. PATENT DOCUMENTS

| 1,800,421 | 4/1931 | Wickersham et al. | 119/96 |
| 2,233,397 | 3/1941 | Bloom | 119/96 |
| 2,605,744 | 8/1952 | Urbanski | 119/96 |
| 2,817,393 | 12/1957 | Mitchell | 119/96 |
| 5,154,660 | 10/1992 | Snyder et al. | 119/96 |

FOREIGN PATENT DOCUMENTS

| 3837507 | 1/1990 | Fed. Rep. of Germany | 119/106 |
| 2301273 | 9/1976 | France | 119/96 |
| 2502962 | 10/1982 | France | 119/96 |
| 2201874 | 9/1988 | United Kingdom | 119/106 |

*Primary Examiner*—Gene Mancene
*Assistant Examiner*—Todd E. Manahan
*Attorney, Agent, or Firm*—Oblon, Spivak, McClelland, Maier & Neustadt

[57] ABSTRACT

An animal harness for restraining an animal with a leash having a front strap, a body strap, and a width restricting strap. Each end of the front strap is attached to the body strap with a connecting member which has slits for receiving both the front strap and the body strap therethrough. The width restricting strap is designed to pass between the front legs of the animal and secured at one end to the front strap and at the other end to the body strap. At least one ring connecting member is provided on an upper part of the body strap for securing a leash thereto.

17 Claims, 5 Drawing Sheets

ANIMAL HARNESS

BACKGROUND OF THE INVENTION

1. Field of the Invention

The present invention relates to a harness useful for attaching a leash to a pet such as a dog, monkey, or the like.

2. Discussion of Background

A dog harness known in the prior art is of such design that the ends of front and rear band members are connected to each other by ring-like fittings with a leash being connected to these two ring-like fittings.

The prior-art harness is fitted with a leash inserted through these two ring-like fittings.

The prior-art harness is fitted with a leash which is inserted but not fastened in both ring-like fittings. Therefore it has the disadvantage that if a dog goes wild, the ring-like fittings will expand to loosen the harness from the dog's body, and moreover, the harness is likely to move laterally or longitudinally from a desired position as the dog moves during use.

SUMMARY OF THE INVENTION

Accordingly, it is a first object of the present invention to prevent the accidental detachment of the harness from a dog or other animal.

It is a second object of the present invention to prevent movement of the harness out of proper positioning and also to reliably facilitate the attachment of the harness around an animal.

In order to accomplish the objects mentioned above, the present invention comprises a front strap which surrounds the front of an animal at the base of the animal's neck, a body strap which surrounds the body of the animal behind the front legs, and a width restricting strap which prevents the separation of the front strap and the body strap from exceeding a predetermined width. The front strap is joined to the body strap by a plate-like connecting member provided at each end of the front strap. The plate-like connecting members are preferably formed with slits which receive the front strap and the body strap. The body strap may either be formed as a single continuous strap threaded through slits in the plate-like connecting member, or its upper and lower parts may be provided separately, such that the upper and lower parts each terminate at a slit provided in the plate-like connecting members. In either case, the body strap is provided with a pair of releasably interconnectable ends for securing and removing the harness from an animal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
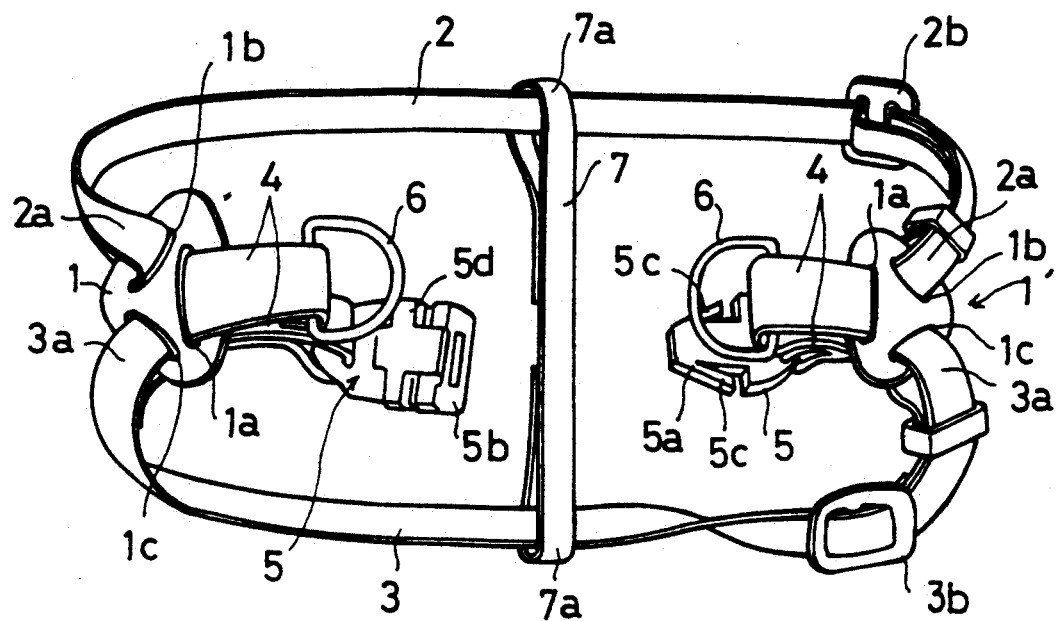
FIG. 1 is a perspective view showing a first embodiment of the present invention.

Referring now to the drawings, wherein like reference numerals designate identical or corresponding parts throughout the several views, the first embodiment of the invention will first be explained with reference to FIGS. 1-3.

Reference numerals 1 and 1' refer to plate-like connecting members, which are approximately triangularly shaped, each plate-like connecting member having a first slit 1a in the upper side thereof, a second slit 1b, and a third slit 1c, such that the first, second and third slits substantially form a triangle.

Figure 3:
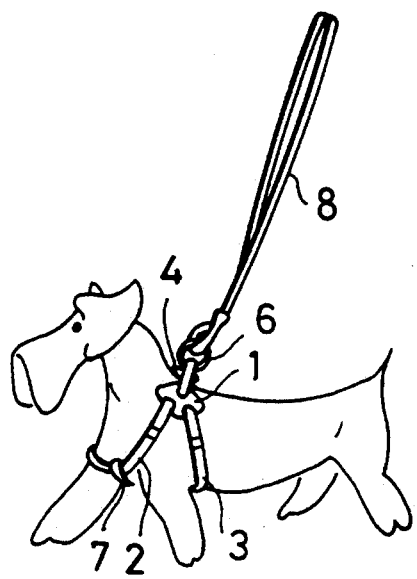
FIG. 3 is an explanatory view showing the first embodiment of the invention in use.

A numeral 2 denotes a front strap, and the numerals 3 and 4 together represent a body strap, as can be seen from FIG. 3. The front strap 2 and the body strap 3, 4 can be long braided ropes produced of nylon or the like, for example. Each end 2a of the front strap 2 is inserted through the second slit 1b of a respective one of the connecting members 1 and 1'. On one side of the front strap 2 is provided a buckle 2b, by which the length of the front strap 2 can be adjusted. Each end 3a of a lower part 3 of the body strap 3, 4 is inserted and fastened within the third slit 1c of a respective one of the connecting members 1 and 1'. One of the ends 3a is provided with a buckle 3b for the adjustment of the length of lower part 3 of the body strap 3, 4.

Figure 2:
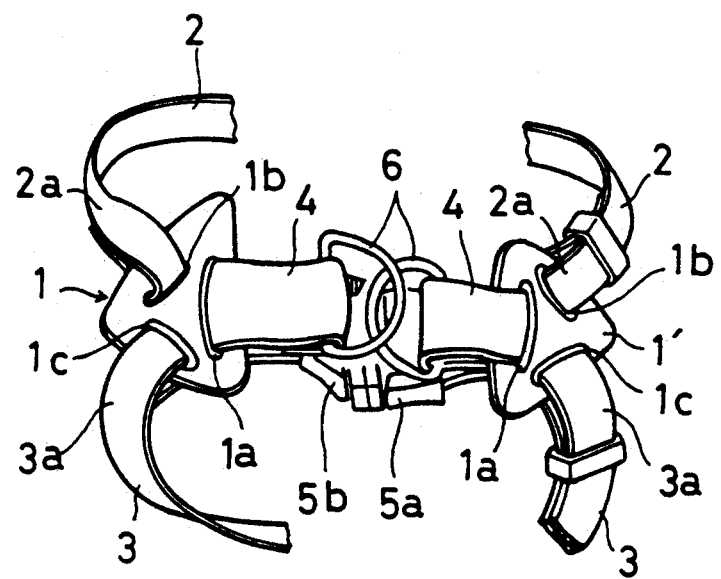
FIG. 2 is a perspective view showing a major portion of the first embodiment of the invention in a connected condition.

As can be seen in FIGS. 1-3, an upper part of the body strap 3, 4 in the first embodiment of the invention is configured as a pair of connecting straps 4, 4. The connecting straps 4, 4 are inserted and folded in the first slits 1a, 1a of the connecting members 1 and 1', and they are fastened by welding in the vicinity of the folded section. A numeral 5 expresses a connecting member for releasably interconnecting the ends of the connecting straps 4, 4 to secure the body strap 3, 4 around the body of an animal. The connecting member 5 includes a tongue section 5a and a buckle section 5b. The tongue section 5a is attached on one end of a first one of the connecting straps 4, and the buckle section 5b is attached on one end of the other connecting straps 4. The tongue section 5a has an inserting member and elastic pieces 5c, 5c protruding at the forward end on both sides and expanding toward the root section. The buckle section 5b is in the shape of a rectangular box provided with a slit on each side with which the elastic pieces 5c, 5c can engage. The buckle section 5b is provided with a sliding member 5d which slides along the rectangular box to release the elastic pieces 5c, 5c that are locked in the slit.

Numerals 6, 6 denote connecting rings which are secured to each of the connecting straps 4, 4. Preferably, connecting rings 6, 6 are formed in a D shape, and have a straight side which is connected to an end of connecting straps 4, 4 which is remote from the tongue section 5a and the buckle section 5b.

A numeral 7 refers to a width restricting strap. It has ends 7a, 7a which are doubled back around the front strap 2 and the lower part 3 of the body strap 3, 4, the rolled back ends 7a, 7a being reattached to the strap 7 to restrict the straps 2 and 3 from spreading apart.

A numeral 8 refers to a leash which can be secured to the connecting rings 6, 6.

Next, the function of the present invention will be explained. First, the front strap 2 and the lower part 3 of body strap 3, 4 are adjusted to a desired length using the buckles 2b and 3b in accordance with the thickness of a body, especially the chest, of a dog. Next, the dog's front legs are inserted between the straps 2 and 3, one leg on each side of the width restricting strap 7. Then, holding the tongue section 5a and the buckle section 5b of the connecting member 5, the inserting portion of the tongue section 5a of the connecting member 5 is inserted into the rectangular box of the buckle section 5b until the elastic pieces 5c, 5c engage with the slit, thus connecting the tongue section 5a and the buckle section 5b. Accordingly, the front strap 2 and the body strap 3, 4 are attached on the front leg and chest area on the dog as shown in FIG. 3. Next, a hook of the leash 8 is attached to the connecting rings 6, 6, thereby holding the harness snug on the check area of the dog and also reliably connecting the leash to the dog. To remove the harness, the sliding member 5d of the buckle section 5b is slid to press the elastic pieces 5c, 5c inward against elasticity by the releasing projections formed on the sliding members 5d, thereby detaching the tongue sections 5a from the buckle section 5b.

Figure 4:
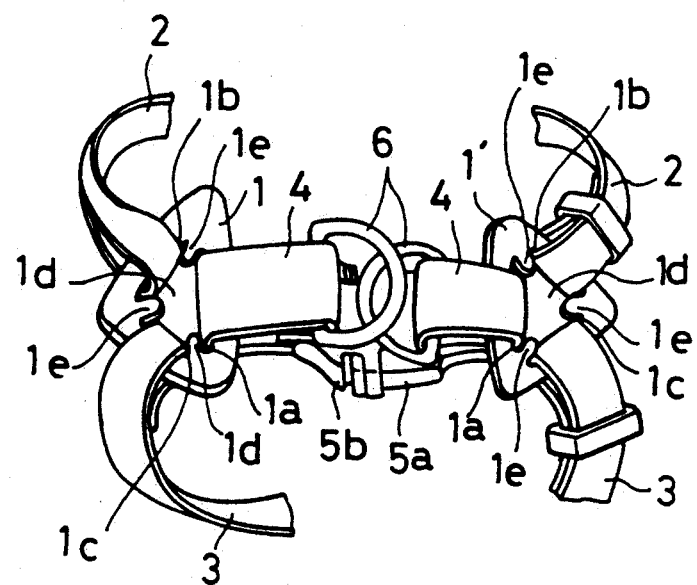
FIG. 4 is a perspective view of the invention illustrating an alternative configuration for the plate-like connecting members of the first embodiment.

FIG. 4 shows a variation of the connecting members 1 and 1'. The connecting members 1 and 1' are of a triangular form and they are provided with through holes 1d, 1d. At the vertex of each of the through holes 1d, 1d is formed a projection 1e. Within each of the through holes between the projections 1e are provided the first to third slits 1a to 1c in substantially a triangular arrangement. In the first to third slits 1a to 1c are inserted the connecting strap 4, the front strap 2, and the body strap 3, respectively. Thus, the plate-like connecting members 1, 1' of FIG. 4 have a simple construction and they are of light weight.

The connecting ring 6 may be triangular or square rather than D-shaped. In the above-described embodiment is given an example that a connecting ring is attached to each of two connecting straps 4, 4. However, the upper part of the body strap may be formed as a single connecting strap 4.

Figure 5:
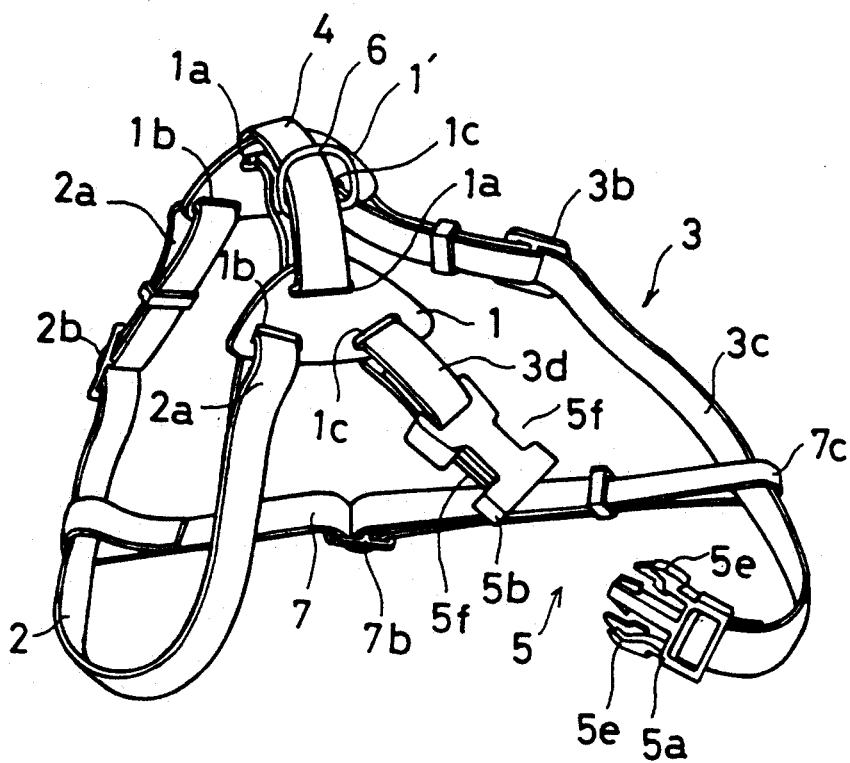
FIG. 5 is a perspective view showing a second embodiment of the present invention.
Figure 6:
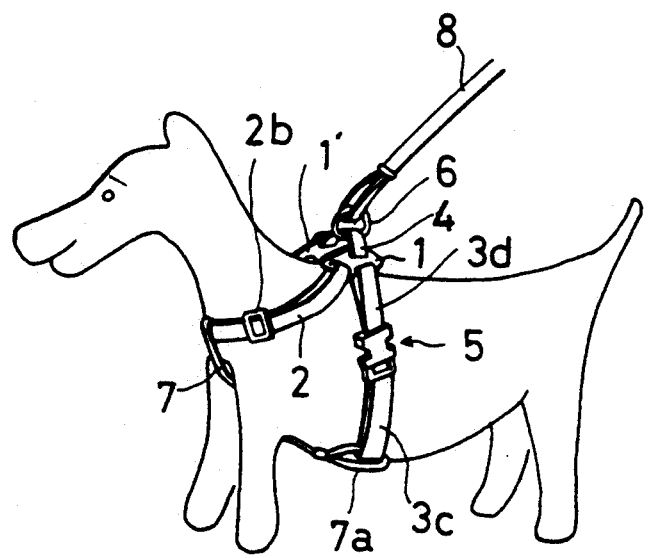
FIG. 6 is an explanatory view showing the second embodiment of the invention in use.

FIGS. 5 and 6 show a second embodiment of the present invention, in which the connecting member 5 is provided on the lower part 3 of the body strap 3, 4 rather than on the connecting strap 4. In FIGS. 5 and 6, a single connecting ring 6 is carried by a single connecting strap 4 which is threaded through the first slit 1a of plate-like connecting member 1 and the first slit 1a of the plate-like connecting member 1'. The lower part 3 of body strap 3, 4 consists of a first lower body strap portion 3c and a second lower body strap portion 3d. The first lower body strap portion 3c is formed long in size, with its one end connected to the tongue section 5a of the connecting member 5 and with its other end inserted into the third slit 1c of the plate-like connecting member 1' and bent back to be connected to the buckle 3b. The belt length can be adjusted by sliding the buckle 3b.

The second lower body strap portion 3d is formed short in size, with its one end connected to the buckle section 5b of the connecting member 5 and the other end connected to the third slit 1c of the connecting member 1. Furthermore, the locking projection 5a consists of an inserting member and elastic pieces 5e, 5e positioned on both sides of its root section and externally having a locking section. The buckle section 5b is made in the form of a rectangular box, and on both sides are formed slits 5f, 5f in which the locking section of the elastic pieces 5e, 5e are engaged. Furthermore, the width restricting strap 7 is also fitted with a buckle 7b, which slides to adjust the length of the strap 7. In this second embodiment, first the buckle 2b of the front strap 2 is loosened wide enough to allow the insertion of the dog's head. After the insertion of the dog's head, the buckle 2b is adjusted to attach the front strap 2 around the base of the dog's neck. Subsequently, after the buckles 3b and 7b of the body strap 3 and the width restricting strap 7 are loosened, the tongue sections 5a of the connecting member 5 attached to the end of the first lower body strap portion 3c of the lower part 3 of body strap 3, 4 is held by hand and inserted through the loop at the forward end 7c of the width restricting strap 7 which is inserted in the front strap 2 and hanging between the dog's front legs. Then the tongue section 5a is fitted into, and connected with, the buckle sections 5b of the connecting member 5 of the second body strap portion 3d. Then the buckles 3b and 7b are slid to adjust the length of the strap to the dog's body, so that the harness will snugly rest on the dog as shown in FIG. 6.

Subsequently, a hook of a lash 8 is attached to the connecting ring 6 to allow for easy movement of the dog and at the same time the connecting ring 6 located on the back of the dog will not move from its desired position.

To remove the harness, the elastic pieces 5e, 5e of the tongue sections 5a fitted in the buckle section 5b are pressed inwardly, and the tongue section 5a is pulled out of the buckle section 5b.

Figure 7:
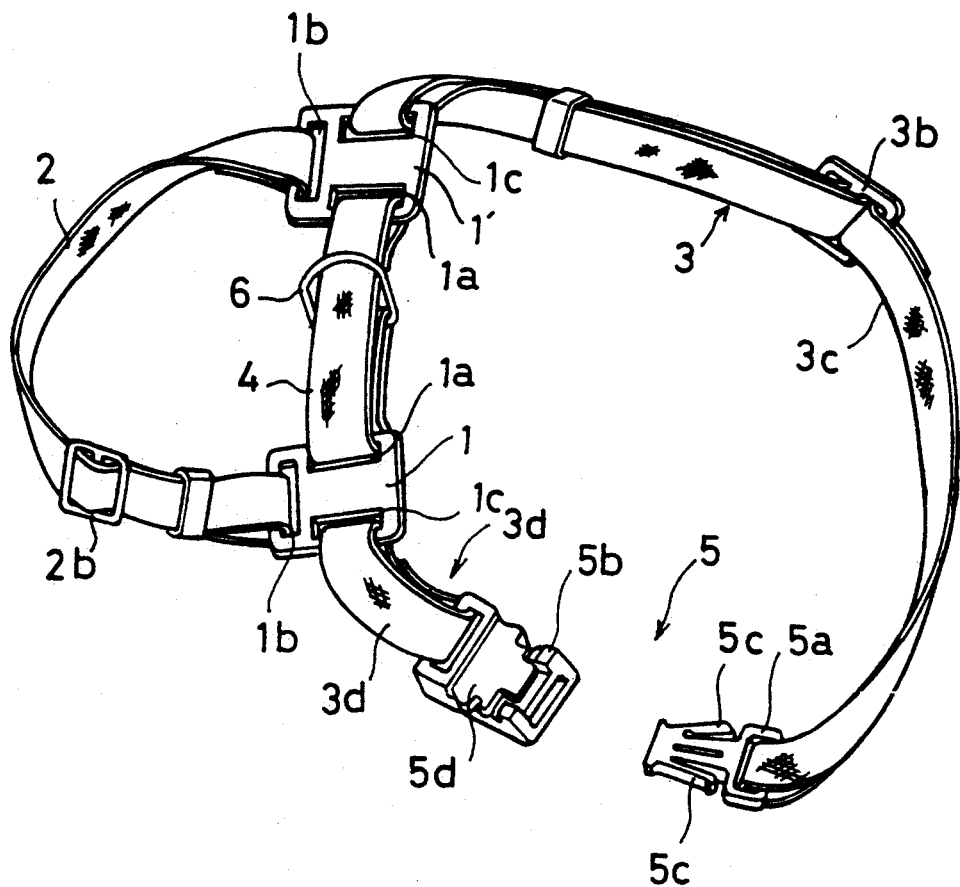
FIG. 7 is a perspective view showing a third embodiment of the present invention.
Figure 8:
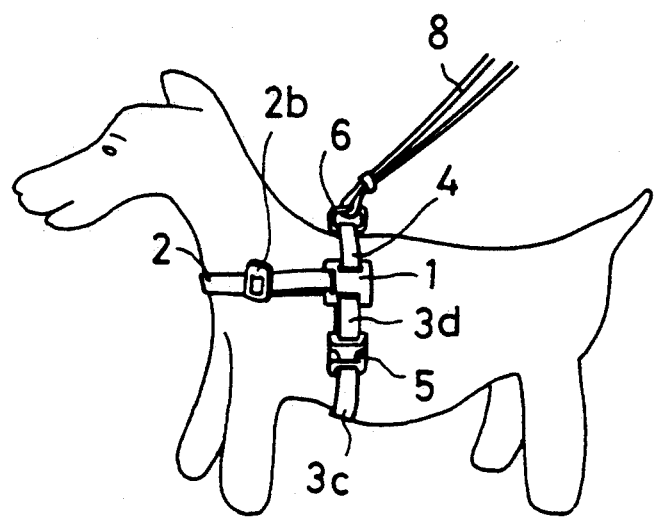
FIG. 8 is an explanatory view showing the third embodiment of the invention in use.

FIGS. 7 and 8 indicate a third embodiment of the present invention. In the third embodiment, the connecting members 1 and 1' are square members, in the upper and lower part of which are provided the first slit 1a and the third slit 1c, parallel to one another. At a right angle to the first and third slits 1a and 1c is formed the second slit 1b.

In the third embodiment the length of the front strap 2 is adjusted by the buckle 2b to the size of the dog's chest, and furthermore the body strap 3 is spread by loosening the buckle 3b of the first lower body strap portion 3c. Next, after the front strap 2 is inserted over the dog's head, the tongue section 5a and the buckle section 5b of the connecting member 5 are held by hand to be connected to each other by inserting the tongue section 5a into the buckle section 5b of the connecting member 5. Then the strap length is adjusted by sliding the buckle 3b to the size of the dog's body. Then the harness can snugly rest on the dog's body as shown in FIG. 8. Next, the hook of the leash 8 is attached to the connecting ring 6, thereby facilitating the movement of the dog and preventing the dislocation of the connecting ring 6 from the dog's back. To remove the harness, the sliding member 5d of the buckle section 5b is slid to bend the elastic pieces 5c, 5c of the tongue section 5a inwardly against the elasticity of the elastic pieces 5c, 5c. Thus the tongue section 5a will come out of the buckle section 5b.

Figure 9:
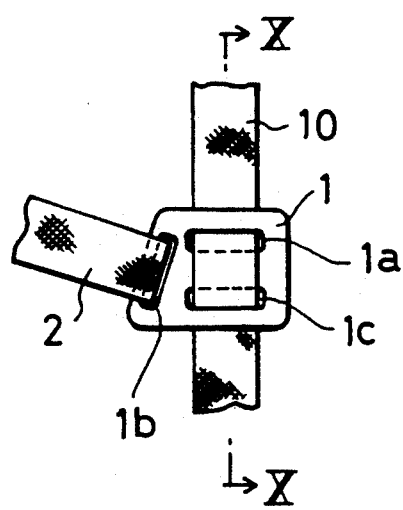
FIG. 9 is a plan view showing a variation of the configuration of the connecting member and body strap of the third embodiment.
Figure 10:
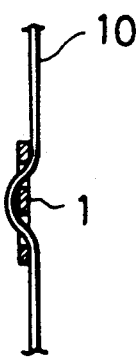
FIG. 10 is a sectional view taken along line X—X of FIG. 9.

FIGS. 9 and 10 show variations of the connecting members 1 and 1' of FIG. 7. In these variations, one side of the connecting members 1 and 1' is inclined and an inclined second slit 1b is formed in this side section, and similar first and third slits 1a and 1c are provided adjacent to the second slit 1b. The front strap 2 is inserted and fastened through the second slit 1b.

In the first and third slits 1a and 1c of the connecting members 1 and 1' is inserted a common strap 10 which integrally comprises the lower part 3 and the connecting strap 4 of body strap 3, 4. To a first end of the common strap 10 is attached the second section 5a, and the buckle section 5b is connected to the other end of common strap 10. The upper part of common strap 10 extending between the connecting members 1 and 1' is fitted with the connecting ring 6.

The harness of FIGS. 9 and 10 therefore has the advantage that it has a simple construction and it also has the advantage that the common strap 10 constituting the body strap can be connected reliably by an obliquely pulling force exerted to the second slit 1b obliquely formed, thereby ensuring stabilized connection of the harness on the dog.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An animal harness for securing a leash to an animal comprising:
    a first strap portion for extending around a body of an animal behind its front legs;
    a second strap portion for extending around the front of the animal;
    first and second connector plates, said first and second strap portions connected to each of said first and second connector plates;
    a leash attachment strap portion disposed between and connected to said first and second connector plates such that when said harness is mounted upon an animal said leash attachment strap portion extends over the withers of the animal; and
    leash connecting means connected to said leash attachment strap portion.

2. The animal harness of claim 1, wherein said second strap portion is a separate strap having first and second ends respectively connected to said first and second connecting plates.

3. The animal harness of claim 2, wherein said first strap portion is a separate strap having first and second ends respectively connected to said first and second connector plates, and wherein each of said first and second strap portions include length adjustment means.

4. The animal harness of claim 2, wherein said first strap portion and said leash attachment strap portion are formed of a single strap which extends through each of said first and second connector plates.

5. The animal harness of claim 1, further including a width restricting strap connected to each of said first and second strap portions.

6. The animal harness of claim 1, wherein each of said first and second connector plates includes three strap receiving locations for respectively receiving each of said first strap portion, second strap portion and leash attachment strap portion.

7. An animal harness for securing a leash to an animal, comprising:
    a body strap having an upper part for extending over the withers of the animal and a lower part for extending around the body of the animal behind its front legs, said body strap also having releasably interlocking ends for securing the body strap around the animal;
    a front strap for surrounding the front of the animal at the base of its neck, said front strap having first and second ends each connected to said body strap;
    a width restricting strap designed to pass between the front legs of the animal, said width restricting strap having a first end connected to an intermediate portion of said front strap and a second end connected to said lower part of said body strap, said width restricting strap preventing said front strap from separating from said body strap by more than a predetermined distance; and
    at least one connecting ring provided on said upper part of said body strap for securing a leash thereto;
    the harness further comprising a first plate-like connecting member securing the first end of said front strap to said body strap and a second plate-like connecting member securing the second end of said front strap to said body strap;
    wherein said first and second plate-like connecting members each have first, second and third slits, respectively, wherein said upper part of said body strap passes through each of said first slits, wherein said first and second ends of said front strap are inserted and fastened through said second slits in said first and second plate-like connecting members, respectively, and wherein said lower part of said body strap passes through each of said third slits.

8. An animal harness according to claim 7, wherein said releasably interlocking ends are provided on said upper part of said body strap.

9. An animal harness according to claim 7, wherein said slits are arranged substantially in the shape of a triangle.

10. An animal harness according to claim 9, wherein said first, second and third slits in each of said plate-like connecting members are interconnected by a through hole formed through each of said plate-like connecting members.

11. An animal harness according to claim 7, said releasably interconnecting ends are provided on said lower part of said body strap.

12. An animal harness according to claim 7, wherein said first and third slits are parallel to one another.

13. An animal harness according to claim 7, wherein said upper part of said body strap has a first end which is threaded through a first slit in said plate-like connecting member, said first end of said upper part of said body strap being doubled back and secured to said upper part of said body strap, and wherein said upper part of said body strap has a second end threaded through said first slit in said second plate-like connecting member, said second end being doubled back around a connecting ring and secured to said upper part of said body strap.

14. An animal harness according to claim 7, wherein said upper part of the body strap and said lower part of the body strap form a continuous single common strap which is threaded through the first and third slits in each of said first and second plate-like connecting members.

15. An animal harness according to claim 14, wherein releasably interlocking ends have a tongue section at a first end of said body strap and a buckle section provided at a second end of said body strap.

16. An animal harness according to claim 7, wherein said front strap and said body strap each have adjustment means for adjusting their lengths to accommodate more than one size of animal.

17. An animal harness for securing a leash to an animal, comprising:
 a body strap having an upper part for extending over the withers of the animal and a lower part for extending around the body of the animal behind its front legs, said body strap also having releasably interlocking ends for securing the body strap around the animal;
 a front strap for surrounding the front of the animal at the base of its neck, said front strap having first and second ends each connected to said body strap;
 a width restricting strap designed to pass between the front legs of the animal, said width restricting strap having a first end connected to an intermediate portion of said front strap and a second end connected to said lower part of said body strap, said width restricting strap preventing said front strap from separating from said body strap by more than a predetermined distance; and
 at least one connecting ring provided on said upper part of said body strap for securing a leash thereto;
 wherein said releasably interlocking ends are provided on said upper part of said body strap;
 and wherein said upper part of said body strap includes a first connecting strap threaded through a first slit of a first plate-like connecting member, said first connecting strap having a tongue section at one end thereof forming one of said releasably interlocking ends and a connecting ring at the other end thereof; and wherein said upper part of said body strap includes a second connecting strap threaded through a first slit of a second plate-like connecting member, said second connecting strap having a buckle section at one end thereof forming the other of said releasably interlocking ends and a connecting ring at the other end thereof.

* * * * *